(12) United States Patent
Storm

(10) Patent No.: US 7,880,779 B2
(45) Date of Patent: Feb. 1, 2011

(54) IMAGE SENSOR ARTIFACT ELIMINATION

(75) Inventor: Graeme Storm, Forres (GB)

(73) Assignee: STMicroelectronics (Research and Development) Limited, Marlow, Buckinghamshire (GB)

( * ) Notice: Subject to any disclaimer, the term of this patent is extended or adjusted under 35 U.S.C. 154(b) by 812 days.

(21) Appl. No.: 11/536,166

(22) Filed: Sep. 28, 2006

(65) Prior Publication Data

US 2007/0075883 A1 Apr. 5, 2007

(30) Foreign Application Priority Data

Sep. 30, 2005 (EP) .................. 05368016

(51) Int. Cl.
*H04N 5/217* (2006.01)
*H04N 5/225* (2006.01)

(52) U.S. Cl. ...................... 348/241; 348/376

(58) Field of Classification Search ......... 348/241–251, 348/376

See application file for complete search history.

(56) References Cited

U.S. PATENT DOCUMENTS

| | | | | |
|---|---|---|---|---|
| 5,471,515 | A | 11/1995 | Fossum et al. ................. | 377/60 |
| 5,530,238 | A * | 6/1996 | Meulenbrugge et al. | 250/208.1 |
| 6,128,039 | A * | 10/2000 | Chen et al. ................... | 348/294 |
| 6,181,830 | B1 * | 1/2001 | Sato ............................ | 382/274 |
| 6,184,721 | B1 * | 2/2001 | Krymski ...................... | 327/52 |
| 6,803,958 | B1 * | 10/2004 | Wang .......................... | 348/308 |
| 6,873,363 | B1 | 3/2005 | Barna et al. .................. | 348/308 |
| 7,126,631 | B1 * | 10/2006 | Minemier .................... | 348/246 |
| 7,167,200 | B1 * | 1/2007 | Phan et al. ................... | 348/308 |
| 7,397,505 | B2 * | 7/2008 | Brehmer et al. ............. | 348/243 |
| 7,492,394 | B2 * | 2/2009 | Mentzer ................... | 348/229.1 |
| 7,502,059 | B2 * | 3/2009 | Barna .......................... | 348/300 |
| 2002/0145672 | A1* | 10/2002 | Mentzer ...................... | 348/246 |
| 2005/0099516 | A1* | 5/2005 | Kagle et al. ................. | 348/246 |
| 2005/0128329 | A1 | 6/2005 | Barna et al. ................. | 348/308 |

FOREIGN PATENT DOCUMENTS

| | | |
|---|---|---|
| EP | 1 280 336 | 1/2003 |
| WO | 99/34592 | 7/1999 |

* cited by examiner

*Primary Examiner*—Lin Ye
*Assistant Examiner*—Trung Diep
(74) *Attorney, Agent, or Firm*—Lisa K. Jorgenson; Allen, Dyer, Doppelt, Milbrath & Gilchrist, P.A.

(57) ABSTRACT

The method and circuit corrects errors in an active pixel sensor which generates an output indicative of illumination intensity and which may experience an error in the output as a result of artifacts which produce an erroneous output. The approach includes determining the output from the pixel, comparing the output with a threshold value, and if the output is lower that the threshold value identifying the existence of an erroneous output and storing a value in a latching device in response thereto. A maximum value is generated in response to the latching device to replace the erroneous output, thereby correcting the error. The present invention switches the system from the analog to digital domain with respect to the issue of artifacts by using a latch to store a value which is then used to replace the actual output if the output is wrong.

20 Claims, 6 Drawing Sheets

US 7,880,779 B2

IMAGE SENSOR ARTIFACT ELIMINATION

FIELD OF THE INVENTION

The present invention relates to image sensors, and more particularly to artifact elimination in active pixel sensors (APS).

BACKGROUND OF THE INVENTION

Active pixel sensors (APS) are used in many approaches to produce images for viewers in many different circumstances. Some particular examples include mobile phone cameras and digital cameras. Active pixel sensors or image sensors are generally found in arrays of rows and columns, each sensor having a photo detector that outputs a light signal indicative of the light illuminating that pixel. The output is then converted into an electrical signal to be stored or used in other ways.

The image sensors may encounter a wide range of illumination intensities. In certain high illumination levels, the pixel may become saturated. One would thus expect the output of that sensor to represent a white level for that part of the scene. However this is not always the case and conventional CMOS APS image can sometimes show the brightest part of the scene as black or grey.

The effect comes from the double sampling nature of such images. Referring to FIG. 1, this effect will be described in more detail. A four transistor pixel 100 is shown connected to a column current source 110 and sampling capacitors 120. A typical operation of the process of a pixel including a reset, integration and a read step is as follows:

1. The photodiode 102 is reset by pulsing device 104;
2. As the voltage on device 104 falls the integration period begins;
3. At the end of the integration period of the pixel photo device 106 goes high and device 108 is pulsed such that the floating diffusion (FD node) 109 is reset;
4. The reset voltage of the FD node 109 is sampled via the source follower onto the Cblk capacitor of the sampling capacitors 120;
5. Device 104 is pulsed again and the charge from the photodiode is transferred to the FD node (and the FD voltage will reduce);
6. The signal value is sampled onto capacitor Csig of the sampling capacitors 120;

During the sampling period the negative terminal of both Csig and Cblk are connected to ground. The brightness of any pixel in the array is proportional to the difference between Vblk and Vsig. However, if the illumination is sufficiently high the double sampling scheme can break down. The problem occurs with the blk value sampled in step 4 above and occurs because the FD node voltage can discharge due to light induced current. There will be a finite time between the reset pulse falling and the blk level being sampled in the column. If the illumination is sufficiently high, the FD node 109 can be partially or fully discharged by the time the level is sampled onto Cblk 120 in the column. This causes the difference between Vblk and Vsig to reduce for increasing illumination levels.

Once the blk and signal voltage levels have been sampled it is common for the difference to be converted to a digital word on-chip. This could be done by multiplexing Vblk and Vsig in the FIG. 1 example for each column to a single on-chip ADC or by using a single analog to digital converter (ADC) per column.

A single slope ADC 200 implementation shown in FIG. 2 will now be described in more detail. Assuming the reset level (blk) is greater that the signal level (Vblk>Vsig) the output of comparator 130 will initially be low.

1. The negative terminal of Csig is connected to a ramp generator (not shown) and begins to ramp up from 0V.
2. Currently a counter begins to count up from zero.
3. As the ramp increases, the top plate of capacitor Csig also increases to maintain the same voltage across Csig.
4. When the non-inverting input of the comparator reaches the level of the inverting input the comparator will flip state and output a high state.
5. This will cause the current value of the counter 210 to be latched 220 into a bank of SRAM 230.

The counter, latch, SRAM and comparator 130 form the basic elements of the ADC in this example.

There have been a number of methods proposed for overcoming this artifacts problem. U.S. patent publication Ser. No. 2003/0133627 discloses a way of preventing the sampled voltages from the pixel falling below a predetermined level. If the column voltage falls below a certain level it will be clamped. However the clamp circuit that would allow it to operate is not provided. There is a suggestion that a revised clamp circuit would be relatively simple but maintaining the output after the sampling period would most certainly not.

U.S. Pat. No. 6,803,958 discloses an apparatus and method for eliminating artifacts in active pixel sensor (APS) imagers. The detection method is achieved by placing an additional comparator in the column and uses the output of the comparator to switch in an analog voltage which is known to be equal to a white level. A capacitor is used to hold the signal voltage prior to input to the additional comparator. The comparison element then adjusts the output voltage to a level which is equivalent to a saturated pixel.

This approach has a number of intrinsic problems associated therewith, and these are detailed below. An extra sample and hold capacitor is required in the column to hold the input to the comparator. This will require extra silicon area and will reduce the setting time of the column for a given column current due to the existence of an extra capacitor. An extra analog voltage is required that equates to a saturated level (Vaa). The comparator needs to be on for as long as the output signal is valid (the full ADC cycle id on-chip ADC used). This will increase the power consumption of the system In addition, if this approach were to be used in a situation where pixels binning for column/row averaging were carried out there would need to be multiple elements which would greatly increase the system overheads. There would need to be additional capacitors voltage supply means and comparators. The resultant circuitry would become quite large and because there are many capacitors still further problems associated with settling time will be encountered.

SUMMARY OF THE INVENTION

One object of the present invention is to overcome at least some of the problems discussed above.

The present invention is directed to the method and apparatus as defined in the claims. According to one aspect of the present invention there is provided a method of correcting errors in an active pixel sensor which generates an output indicative of illumination intensity and which may experience an error in the output as a result of artifacts which produce an erroneous output. The method includes determining the output from the pixel, comparing the output with the threshold value, and if the output is lower that the threshold value, identifying the existence of an erroneous output and storing a value in a latching means/circuit in response thereto.

A maximum value is generated in response to the latching means/circuit to replace the erroneous output, thereby correcting the error.

This has the advantage of overcoming the problem of artifacts and at the same time providing a simple, effective system. The present invention switches the system from the analog to digital domain with respect to the issue of artifacts by using a latch to store a value which is then used to replace the actual output if the output is wrong.

There are several further advantages including: reduced or no delays for settling time; simple, inexpensive and space saving elements, less signal processing at the ADC, as there is no need to process the output from the correction circuit therein; power savings as the comparator is only on when needed, this will save battery life, etc.; and for pixel averaging or binning the additional circuitry and methodology for operating the same is much reduced when compared with the prior art.

BRIEF DESCRIPTION OF THE DRAWINGS

Reference will now be made, by way of example to the accompanying drawings, in which.

DETAILED DESCRIPTION OF THE PREFERRED EMBODIMENTS

Figure 1:
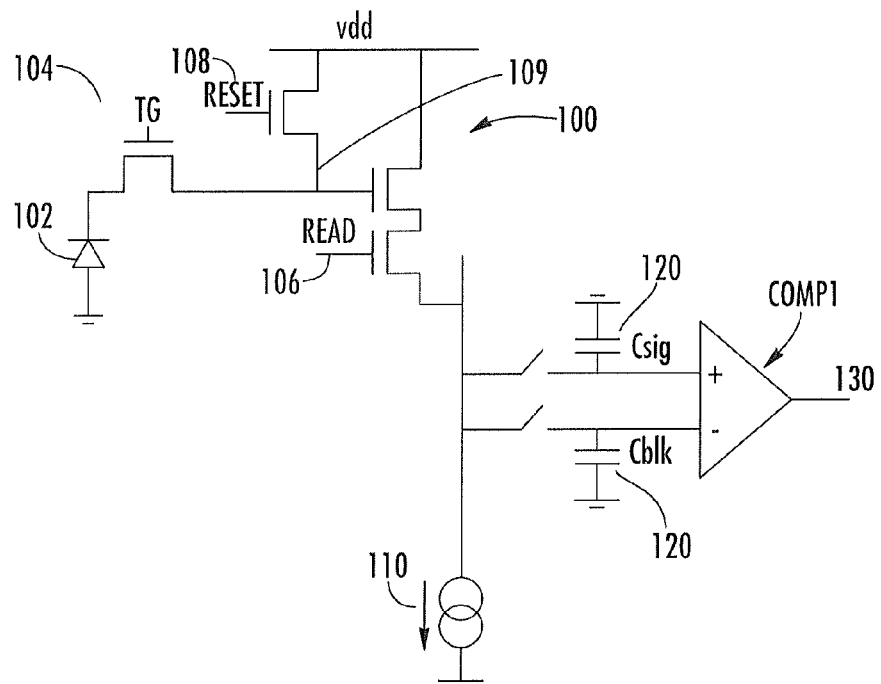
FIG. 1 is a circuit diagram of a prior art pixel and column sampling capacitor set up.
Figure 3:
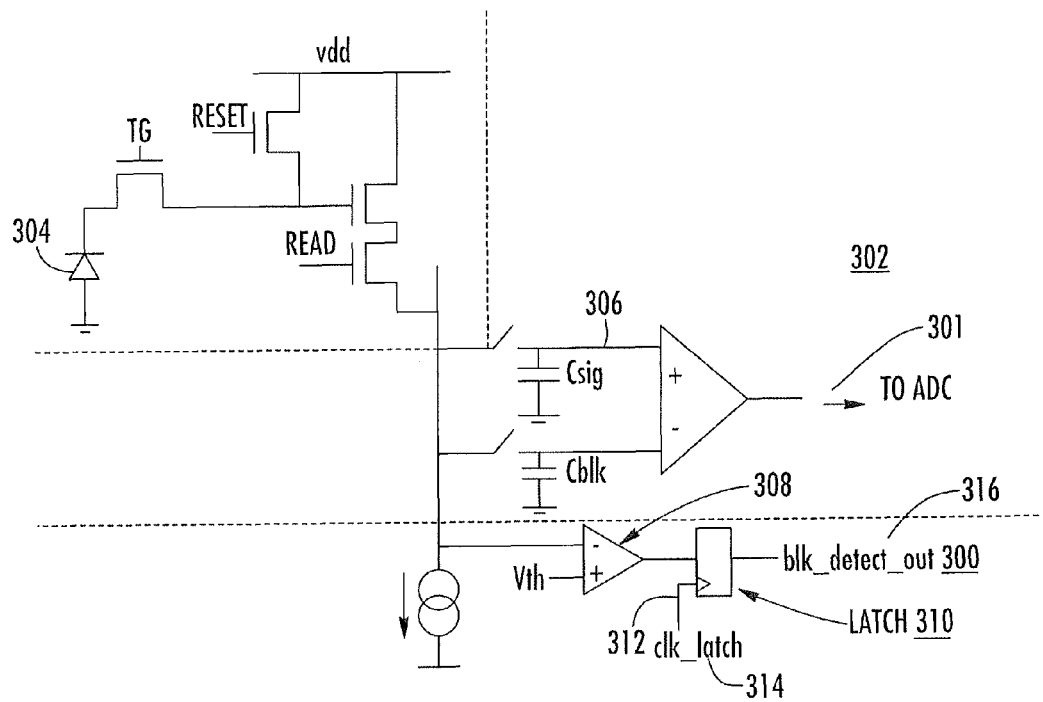
FIG. 3 is a circuit diagram of a pixel and a saturation detector according to first aspect of the present invention.

As previously indicated, extremely bright parts of a scene may appear darkened due to the reset voltage being discharged by light induced currents. A method to prevent this darkening of bright areas which overcomes the problems is provided. The approach includes using an additional or correction circuit section 300 in FIG. 3. The rest of the circuit 302 is identical to the pixel 304 and sampling elements 306 of FIG. 1. The additional section 300 includes a comparator 308 situated in the column which detects if the blk voltage sampled from section 306 is below a pre-determined threshold voltage (Vth). The output of the comparator 308 is connected to a latch 310 with a control signal 312 given by clk_latch 314.

During the blk sampling period, if the column voltage is above the threshold (Vth), the output of comparator 308 will be low but if the column voltage falls below the threshold, the output of comparator 308 will go high. The control signal 312 (clk_latch) is high during the blk sampling period such that the output of the comparator goes straight through to the output of the latch. At the end of the blk sampling period clk_latch falls and the output of the comparator (blk_detect_out) 316 is sampled and held. Thus for the ADC conversion the blk_detect_out signal can be used to decide whether to perform a conventional ADC conversion or just output a maximum code value, based on the value stored in the latch.

Figure 2:
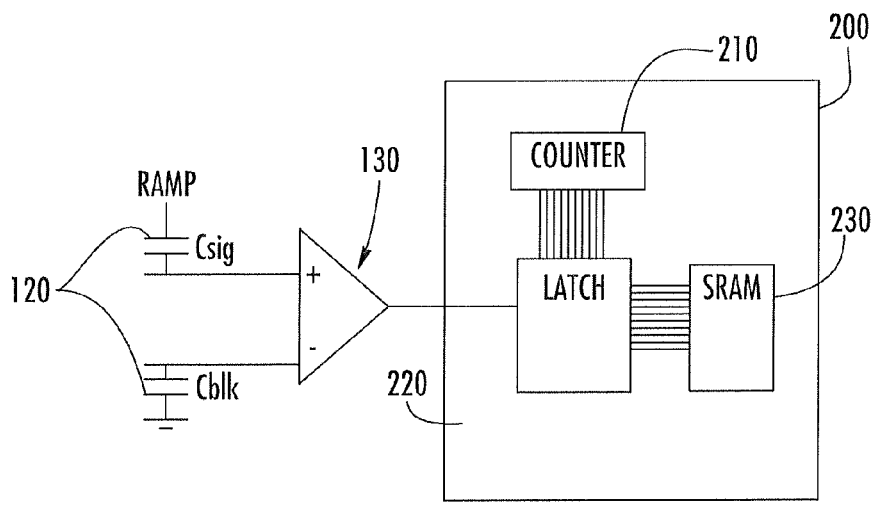
FIG. 2 is a circuit diagram of a known ADC implementation.

The detection scheme requires a comparator in the column but not other overhead. The comparator only needs to be powered up during the blk sampling period which means that power consumption is kept low. For the single slope ADC of FIG. 2 the blk_detect_out signal could be used to power down comparator 130 such that its output was always low and the latch did not fire. In this case the last value written by the counter 210 in FIG. 2 (which would be the highest code and represent white) would be stored by the SRAM 230.

Accordingly the ADC receives an analog output 301 as normal from the sampling section 306 and a select signal 316 which tells the ADC to output a maximum value rather the analog output 301 from the sampling section. This means that if there is an artifact on the pixel output the latch value is used instead of the erroneous output value thereby overcoming the artifact problem.

Figure 4:
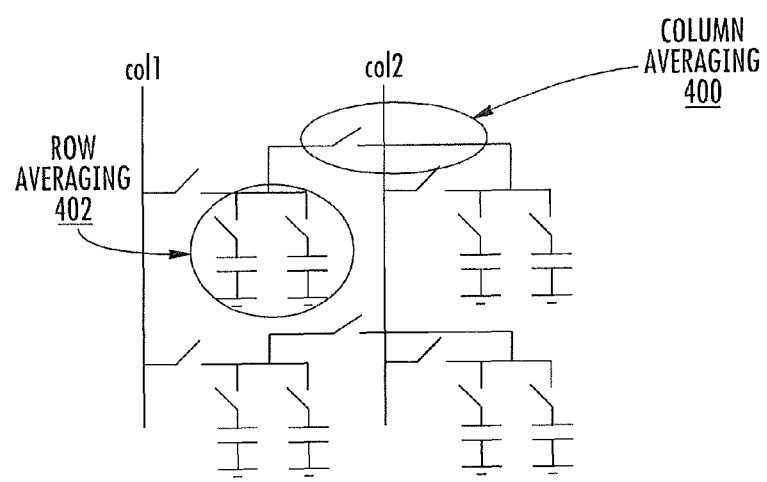
FIG. 4 is a schematic diagram for illustrating pixel binning or averaging.

This approach is not as straightforward in the environment where pixel binning or column averaging is used. Pixel binning is used mainly in larger format arrays, to increase the readout speed and improve signal to noise ratio (SNR). Pixel binning also reduces power consumption. This may be relevant in a telephone camera for example where the screen is small and not all pixels can be displayed on the screen per se, i.e. where a full field of view (FOV) is required but resolution can be compromised. Pixel binning involves producing an average pixel value in the column and/or in rows. Referring to FIG. 4, the reset or signal level is sampled for each pixel then the sampling capacitors are shorted together 400, 402 to share the charge. This effectively averages the pixels that have been sampled. There are two main ways in which to deal with an in correct reset level of a single pixel whilst performing pixel binning. Firstly one may make the result for the averaged pixels a white value, which is the simplest approach. Secondly one may detect which pixels are over-saturated and only average the pixels which are not affected by artifacts.

Figure 5:
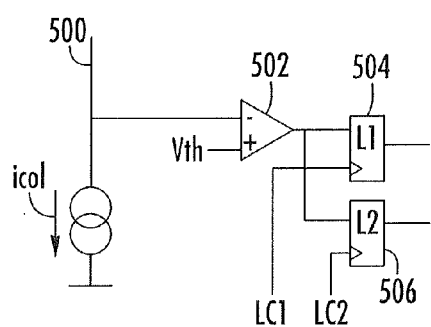
FIG. 5 is a schematic diagram of a saturation detector for two row averaging.
Figure 6:
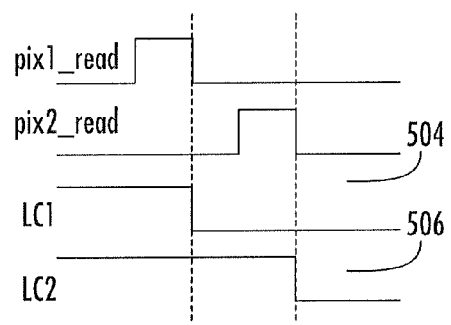
FIG. 6 is a graph showing the voltage levels of the FIG. 5 components with time.

The method used to detect over saturation for two-row averaging is shown in FIGS. 5 and 6. The method uses a similar additional circuit 500 to the additional circuit 300 in FIG. 3. The circuit 500 uses a single comparator 502 situated in the column which is connected to the pixel output bit line (as before). The non-inverting input to the comparator is set at the lowest allowable reset level in the column. Thus if the reset of a pixel causes the bit line to drop below Vth, the output of the comparator goes high. Two memory elements are required since there are two rows being sampled. At the end of the sampling period of the reset level of each pixel, the latch is clocked. This stores the state of the comparator and thus memorizes whether the reset level was satisfactory or too low. The graph of FIG. 6 shows the voltage levels and the effect on latches 504 and 506 respectively.

Figure 7:
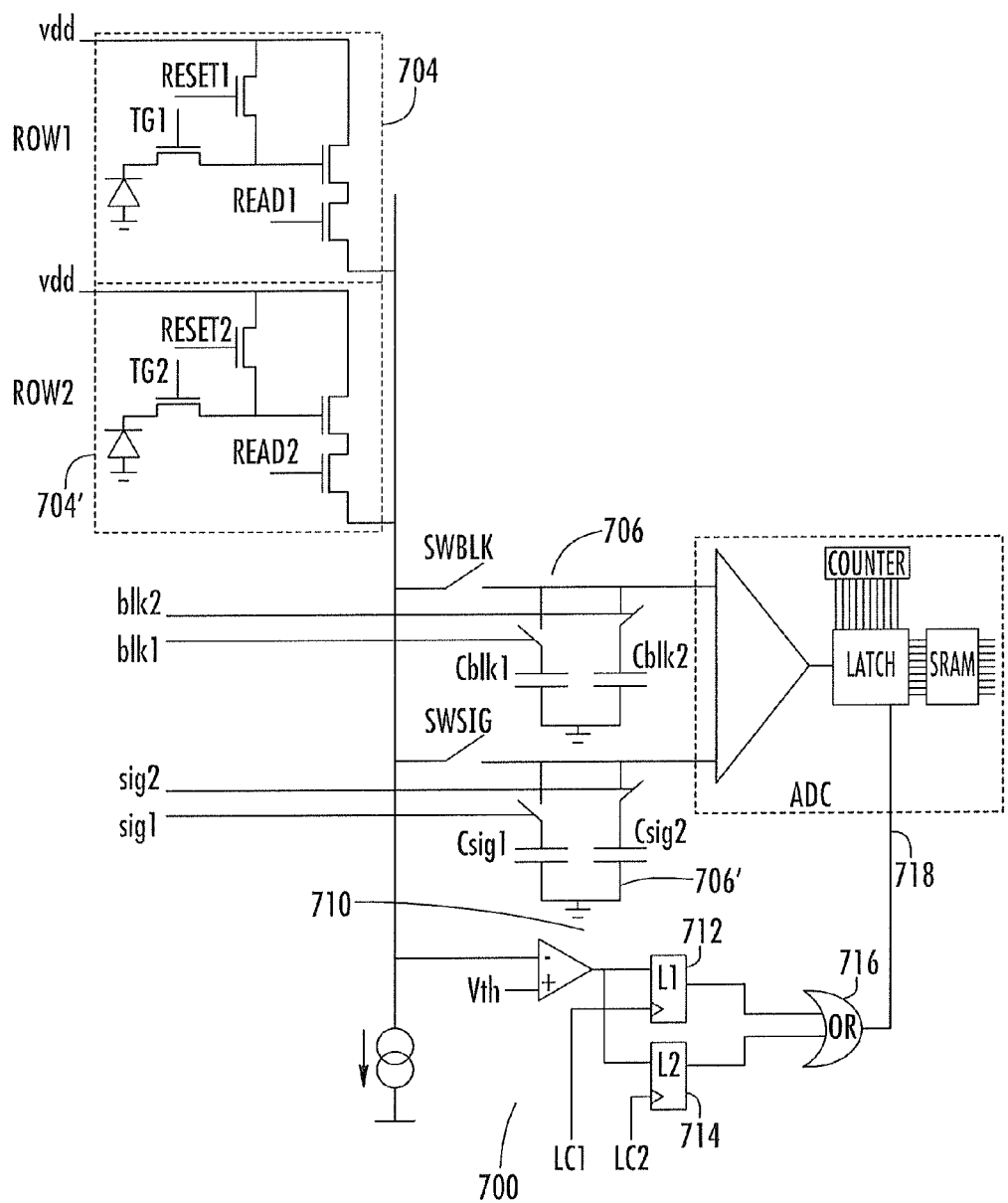
FIG. 7 is a circuit diagram for two row averaging including saturation detection according to a second aspect of the present invention.

FIG. 7 shows a possible architecture for 2 row averaging. Two pixels 704 and 704' from row 1 and 2 respectively are shown. The outputs (blk1, blk2, sig1 and sig2) of each pixel go to respective sampling capacitor circuits 706 and 706' respectively. The output from the sampling capacitor circuits are passed to an ADC 708 (which includes a comparator, counter, latches and SRAM as previously described). An additional circuit 700 (which is equivalent to and works the same way a circuit 500) completes the architecture. The additional circuit includes a comparator 710, two latches 712 and 714 and an OR gate 716. The additional circuit determines whether either of the two pixels reset levels are too low. If either of the pixels 704 or 704' include "a too low reset level" the OR gate 716 will go high and then will transmit a select signal 718 to the ADC. This select signal will indicate to the ADC that a maximum output should be generated rather than the analog voltage from the sampling capacitors (as previously described).

Figure 8:
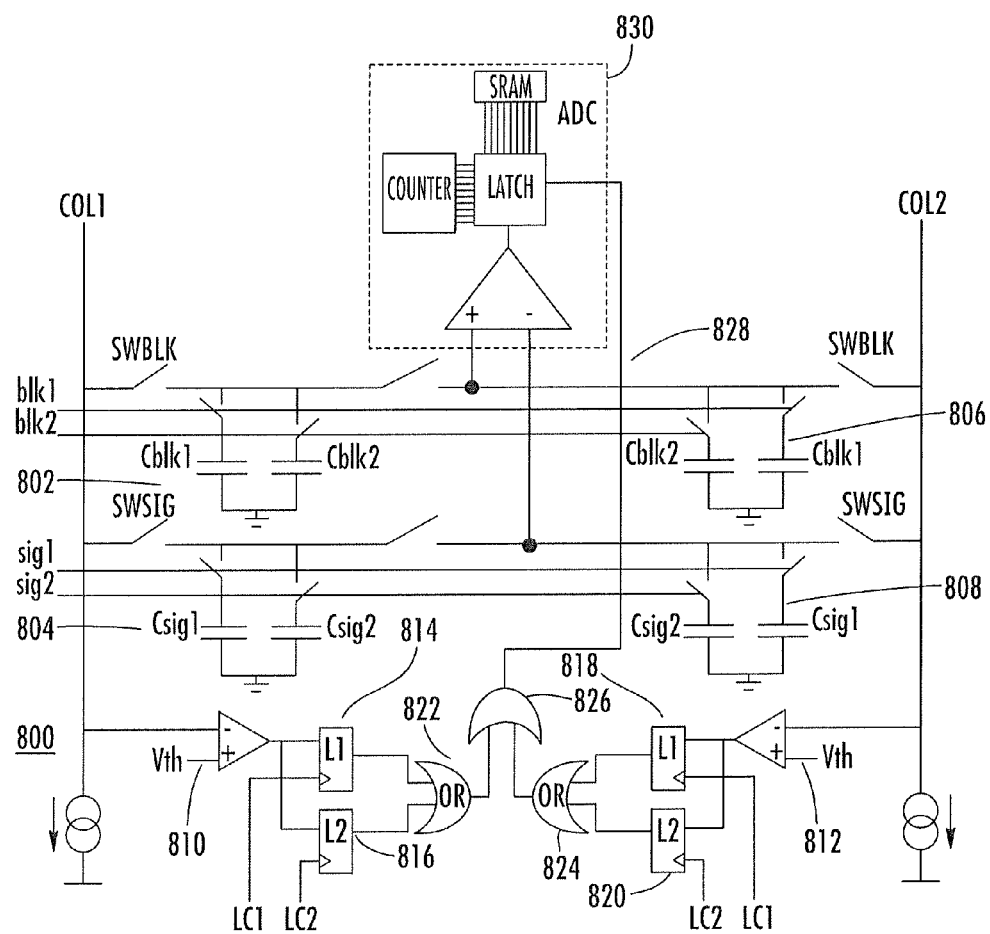
FIG. 8 is a circuit diagram for two rows and two columns averaging including saturation detection according to a third aspect of the present invention.

FIG. 8 shows an example of a possible architecture for two rows, two column averaging of pixels in rows 1 and 2 and columns 1 and 2. Similar sampling circuits 802, 804, 806 and 808 and an additional circuit 800 exists as is earlier described with respect to other embodiments. The additional circuit 800 includes two comparators 810 and 812 respectively, one for the first column (col1) one for the second column (col2). There are latches 814, 816, 818 and 820 for each pixel and OR gates 822, 824 and 826. If any of the latches go high as a result of a "too low reset level" on any one of the pixels, the combination of OR gates will also output a high. This will as previously described give rise to a select signal 828 which causes the ADC 830 to output a maximum value rather than the average analog voltage of the four pixels.

Figure 9:
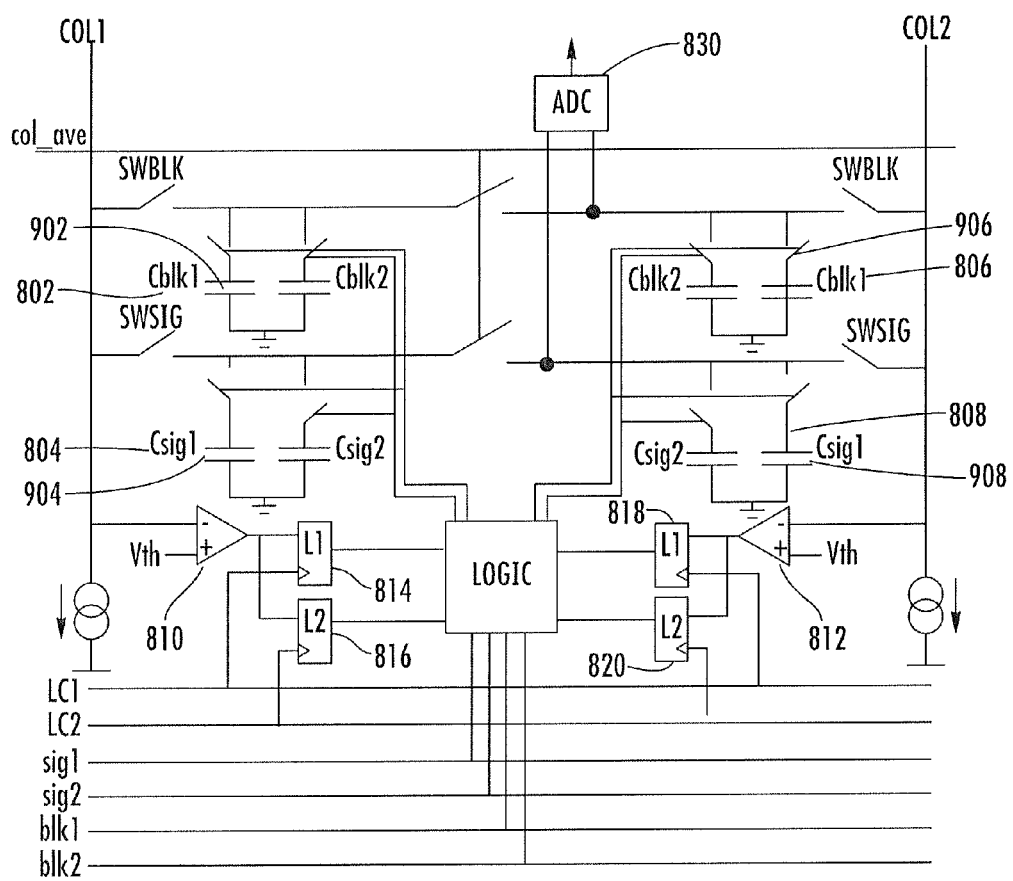
FIG. 9 is a circuit diagram for two rows and two columns averaging including saturation detection according to a fourth aspect of the present invention.

In certain situations it may be possible that not all four pixels (as shown in FIG. 8) are producing artifacts. In fact three may be operating correctly and only one failing. If this is the case it is possible to adapt the additional circuit as is shown in FIG. 9. In FIG. 9 like elements to FIG. 8 are shown with the same reference number to assist comprehension. The OR gates and generation of the select signal 828 are replaced by a logic circuit 900 which produces a feed back to the switches 902, 904, 906 and 908 of each respective sampling circuit 802, 804, 806 and 808. The logic circuit determines if any of the pixel outputs are sound: in other words if there are any pixels which do not have a "too low reset level". If any such pixels exist the logic circuit determines that this is the case and also that there is therefore one or more pixels which is thus working correctly. The logic cell then selects which of the switches 902, 904, 906 and 908 to close and thereby select the analog signal from the pixels which are working correctly as the average for the four pixels. If all four pixels are exhibiting artifacts the logic cell generates a maximum value for transmission to the ADC as earlier described.

The invention can be applied to any amount of averaging, for example 2, 4, 8, 16 etc. In addition, there are a number of variations which may occur within the circuit architecture to achieve essentially the same approach.

That which is claimed is:

1. A method of correcting errors in an active pixel sensor that generates an output indicative of illumination intensity, the method comprising:
    determining the output from the active pixel sensor;
    comparing the output with a threshold value;
    if the output is lower than the threshold value identifying an erroneous output and storing a value in a latching device in response thereto;
    generating a maximum value based upon the value stored in the latching device and correcting the erroneous output by replacing the erroneous output with the maximum value; and
    controlling the latching device with a latch control signal so that a select signal output therefrom is used to determine whether an analog-to-digital converter (ADC) selectively outputs one of the maximum value and a converted output from the active pixel sensor.

2. The method of claim 1, wherein determining the output comprises sampling two pixel signals;
    wherein comparing comprises comparing a first one of the pixels signals with the threshold value; wherein the second of the pixel signals is output if the first signal is above the threshold, and the maximum value is output if the first signal is below the threshold.

3. The method of claim 1, further comprising outputting a pixel output through an analog to digital converter (ADC).

4. The method of claim 3, further comprising blocking the pixel output with the maximum value to cause the ADC to output the maximum value.

5. The method of claim 4, wherein generating the maximum value further comprises determining the maximum value from other active pixel sensors in an array of active pixel sensors which includes the active pixel sensor.

6. A method of correcting errors in an array of active pixel sensors for forming an image, wherein each pixel generates an output indicative of illumination intensity thereon which contributes to the image, the method comprising, for each active pixel sensor in the array:
    determining the output from the active pixel sensor;
    comparing the output with a threshold value;
    if the output is lower than the threshold value identifying an erroneous output and storing a value in a latching device in response thereto; and
    generating a maximum value based upon the value stored in the latching device and correcting the erroneous output by replacing the erroneous output with the maximum value; and
    controlling the latching device with a latch control signal so that a select signal output therefrom is used to determine whether an analog-to-digital converter (ADC) selectively outputs one of the maximum value and a converted output from the active pixel sensor.

7. The method of claim 6, further comprising averaging the outputs of a number of active pixel sensors in the array to reduce resolution of the image.

8. The method of claim 7, wherein generating the maximum value comprises generating the maximum value for outputting based upon at least one of the latching devices and correcting the erroneous output.

9. The method of claim 7, further comprising selecting, as the output, the output from any active pixel sensor which does not include an erroneous output.

10. An active pixel sensor comprising:
    a pixel section which is responsive to illumination thereon to produce an output;
    a sampling section for sampling outputs from the pixel section to determine the output;
    a correction section for identifying if the output is an erroneous output and replacing the erroneous output with a maximum output value;
    the correction section including a comparator to compare the output with a threshold value and generate a value based thereon, and a latch to store the value if the output is below the threshold;
    the maximum output value being based on the value stored in the latch; and
    an analog-to-digital converter (ADC) configured to selectively output one of the maximum value and a converted output from the pixel section based upon a select signal output from the latch.

11. The active pixel sensor of claim 10, wherein the output comprises two pixel signals and the comparator compares a first one of the pixel signals with the threshold value and causes the second of the pixel signals to be output if the first pixel signal is above the threshold, and causes the maximum output value to be output if the first signal is below the threshold.

12. The active pixel sensor of claim 10 further comprising an analog to digital converter (ADC) to output a pixel output.

13. The active pixel sensor of claim 12, wherein the latch value causes the ADC to output the maximum output value.

14. The active pixel sensor of claim 10, wherein the maximum output value is based upon other pixels in an array of pixels which includes the active pixel sensor.

15. An imaging device comprising:
   array of active pixel sensors for forming an image, wherein each active pixel sensor generates an output indicative of illumination intensity thereon which contributes to the image, each active pixel sensor including
      a pixel section which is responsive to illumination thereon to produce an output,
      a sampling section for sampling outputs from the pixel section to determine the output,
      a correction section for identifying if the output is an erroneous output and replacing the erroneous output with a maximum output value,
      the correction section including a comparator to compare the output with a threshold value and generate a value based thereon, and a latch to store the value if the output is below the threshold,
      the maximum output value being based on the value stored in the latch; and
   an analog-to-digital converter (ADC) configured to selectively output one of the maximum value and a converted output from the pixel section based upon a select signal output from the latch.

16. The imaging device according to claim 15, wherein the array of active pixel sensors includes an averaging circuit for averaging the outputs of a plurality of active pixel sensors in the array to reduce resolution of the image.

17. The imaging device according to claim 16, wherein the output of each active pixel sensor is compared to the threshold to determine if any active pixel sensor includes an erroneous output, and the maximum output value is based upon at least one of the latching devices.

18. The imaging device according to claim 16, wherein the output of each active pixel sensor is compared to the threshold to determine if any active pixel sensor includes an erroneous output; and further comprising a logic circuit to generate an output based upon active pixel sensors which do not include an erroneous output.

19. The imaging device according to claim 15, wherein the imaging device defines a digital camera.

20. The imaging device according to claim 15, wherein the imaging device defines a mobile phone including a digital camera.

* * * * *

UNITED STATES PATENT AND TRADEMARK OFFICE
CERTIFICATE OF CORRECTION

| | | |
|---|---|---|
| PATENT NO. | : 7,880,779 B2 | Page 1 of 1 |
| APPLICATION NO. | : 11/536166 | |
| DATED | : February 1, 2011 | |
| INVENTOR(S) | : Storm | |

It is certified that error appears in the above-identified patent and that said Letters Patent is hereby corrected as shown below:

Column 1, Line 24     Delete: "image"
Insert: --images--

Column 2, Line 43     Delete: "system"
Insert: --system.--

Column 3, Line 29     Delete: "to first"
Insert: --to a first--

Column 4, Line 36-37     Delete: "in correct"
Insert: --incorrect--

Column 4, Line 65     Delete: "way a"
Insert: --way as--

Column 5, Line 14     Delete: "one"
Insert: --and one--

Column 5, Line 29     Delete: "feed back"
Insert: --feedback--

Column 7, Line 9     Delete: "array"
Insert: --an array--

Signed and Sealed this
Nineteenth Day of July, 2011

David J. Kappos
*Director of the United States Patent and Trademark Office*